(12) United States Patent
Ishikawa

(10) Patent No.: US 10,145,963 B2
(45) Date of Patent: Dec. 4, 2018

(54) SCINTILLATOR AND RADIATION DOSIMETER USING SAME

(71) Applicant: National University Corporation Hokkaido University, Sapporo-shi, Hokkaido (JP)

(72) Inventor: Masayori Ishikawa, Sapporo (JP)

(73) Assignee: National University Corporation Hokkaido University, Hokkaido (JP)

( * ) Notice: Subject to any disclaimer, the term of this patent is extended or adjusted under 35 U.S.C. 154(b) by 0 days.

(21) Appl. No.: 15/549,591

(22) PCT Filed: Feb. 10, 2016

(86) PCT No.: PCT/JP2016/054016
§ 371 (c)(1),
(2) Date: Nov. 28, 2017

(87) PCT Pub. No.: WO2016/129651
PCT Pub. Date: Aug. 18, 2016

(65) Prior Publication Data
US 2018/0113221 A1    Apr. 26, 2018

(30) Foreign Application Priority Data
Feb. 12, 2015    (JP) .................. 2015-025382

(51) Int. Cl.
*G01T 1/20* (2006.01)
*C09K 11/00* (2006.01)
(Continued)

(52) U.S. Cl.
CPC .............. *G01T 1/023* (2013.01); *C09K 11/02* (2013.01); *C09K 11/595* (2013.01);
(Continued)

(58) Field of Classification Search
CPC .. G01T 1/02; G01T 1/023; G01T 1/20; G01T 1/2018; G01T 1/203; G01T 1/2033;
(Continued)

(56) References Cited

U.S. PATENT DOCUMENTS 7,785,524 B2    8/2010  Imai
2005/0208290 A1*  9/2005  Patel ...................... C09K 11/06
                                                    428/323
(Continued)

FOREIGN PATENT DOCUMENTS

JP    H11-43522      2/1999
JP    2003-502647    1/2003
(Continued)

OTHER PUBLICATIONS

Fujimori, Yukio et al., "Photoreaction and Photoinitiation Behavior in the Light-Cured Dental Composite Resins," Japanese Journal of Polymer Science and Technology, Jun. 1993, vol. 50, No. 6 (pp. 485-488).
(Continued)

*Primary Examiner* — Casey Bryant
(74) *Attorney, Agent, or Firm* — Nixon Peabody LLP

(57) ABSTRACT

Provided are a scintillator with improved energy sensitivity dependence within the energy range of diagnostic X-rays, more specifically in the range of 40-150 kV, and a radiation dosimeter using same. Due to the scintillator comprising a photopolymer resin that contains a polymerizable monomer, a filler, and a photopolymerization initiator, energy sensitivity dependence within the range of 40-150 kV is improved. Furthermore, changes in relative sensitivity within this energy range can be reduced to 3% or less by containing an inorganic fluorescent substance such as $Zn_2SiO_4$.

10 Claims, 1 Drawing Sheet

(51) Int. Cl.
  *G01T 1/02* (2006.01)
  *C09K 11/02* (2006.01)
  *G01T 1/203* (2006.01)
  *C09K 11/59* (2006.01)
  *C09K 11/64* (2006.01)

(52) U.S. Cl.
  CPC .............. *C09K 11/643* (2013.01); *G01T 1/20* (2013.01); *G01T 1/203* (2013.01); *G01T 1/2018* (2013.01); *G01T 1/2033* (2013.01); *C09K 11/00* (2013.01); *C09K 11/59* (2013.01); *C09K 11/64* (2013.01)

(58) Field of Classification Search
  CPC ......... C09K 11/02; C09K 11/00; C09K 11/59; C09K 11/64
  See application file for complete search history.

(56) References Cited

U.S. PATENT DOCUMENTS

2010/0038547 A1  2/2010  Ishikawa
2014/0346400 A1  11/2014 Pei
2015/0241569 A1  8/2015  Okamura

FOREIGN PATENT DOCUMENTS

| JP | 2007-248244 | 9/2007 |
| JP | 4766407 | 9/2011 |
| WO | WO 00/77545 | 12/2000 |
| WO | WO 2014/054422 A1 | 4/2014 |

OTHER PUBLICATIONS

International Preliminary Report on Patentability in International Application No. PCT/JP2016/054016, dated Sep. 30, 2016 (11 pages).
International Search Report in International Application No. PCT/JP2016/054016, dated May 10, 2016 (5 pages).
Written Opinion in International Application No. PCT/JP2016/054016, dated May 10, 2016 (3 pages).
Extended European Search Report for Application No. 16749294.1, dated Sep. 5, 2018 (6 pages).

* cited by examiner

SCINTILLATOR AND RADIATION DOSIMETER USING SAME

CROSS-REFERENCE TO RELATED APPLICATION

This application is a U.S. National Stage of International Application No. PCT/JP2016/054016, filed Feb. 10, 2016, which is related to and claims the benefit and priority of Japanese Patent Application No. 2015-025382, filed Feb. 12, 2015, the contents of which are incorporated herein in their entireties by reference.

TECHNICAL FIELD

The present disclosure relates to a scintillator and to a radiation dosimeter using the same.

BACKGROUND

An extremely small dosimeter (SOF dosimeter) combining a scintillator and an optical fiber has been developed as a dosimeter that can be inserted into a human body and has excellent real-time responsiveness. Such an SOF has been developed as a dosimetric device for brachytherapy using Ir-192, but it is also applicable to X-ray dosimetry.

However, diagnostic X-rays are relatively low in energy as compared with γ-rays for therapy, and energy sensitivity dependence at a tube voltage in a range of 40 kV to 150 kV is not considered.

CITATION LIST

Patent Literature

[Patent Document 1] JP 4766407B

SUMMARY

Technical Problem

In the above-described related art, a plastic scintillator is used as a scintillator, but in consideration of the application as a dosimeter for diagnostic X-rays, a sensitivity change of ±20% or more is observed in the range of 40 kV to 150 kV. Thus, the energy sensitivity dependence is remarkable.

An object of the present disclosure is to provide a scintillator with improved energy sensitivity dependence within an energy range of diagnostic X-rays, more specifically in a range of 40 kV to 150 kV, and a radiation dosimeter using the scintillator.

Solution to Problem

The scintillator of the present disclosure includes a photopolymer resin that contains a polymerizable monomer, a filler, and a photopolymerization initiator.

The present inventors have focused on the finding that a photopolymer resin such as a dental composite resin, in particular, a photopolymerization initiator, has a property of absorbing X-rays and fluorescing, and furthermore, have found that the photopolymer resin has a substantially uniform relative sensitivity in the energy range of the diagnostic X-ray with respect to the generation of the fluorescence, and thus, when the photopolymer resin is used for the scintillator, the energy sensitivity dependence is improved.

In an exemplary embodiment of the present disclosure, the photopolymer resin further contains an inorganic fluorescent substance, and the inorganic fluorescent substance has a relative sensitivity characteristic in an X-ray energy range of 40 kV to 150 kV, which has a complementary relationship with a relative sensitivity characteristic of the photopolymer resin.

In another exemplary embodiment of the present disclosure, the inorganic fluorescent substance is $Zn_2SiO_4$, and its content is preferably 0.01% by weight to 1% by weight.

In still another exemplary embodiment of the present disclosure, the polymerizable monomer contains polyfunctional methacrylate.

In yet another exemplary embodiment of the present disclosure, the photopolymerization initiator contains camphorquinone and amines.

Further, the radiation dosimeter of the present disclosure includes the above-described scintillator, a photoelectric converter that converts light from the scintillator into an electric signal; a counter that counts the number of events whose intensity is equal to or greater than a predetermined threshold with respect to the output from the photoelectric converter; and a calculating unit that converts a count value of the counter into a radiation dose and outputs the radiation dose.

Advantageous Effects of Invention

According to the present disclosure, it is possible to obtain a scintillator with improved energy sensitivity dependence within an energy range of diagnostic X-rays, more specifically in a range of 40 kV to 150 kV, and a radiation dosimeter using the scintillator.

DESCRIPTION OF EMBODIMENTS

Hereinafter, embodiments of the present disclosure will be described.

Figure 1:
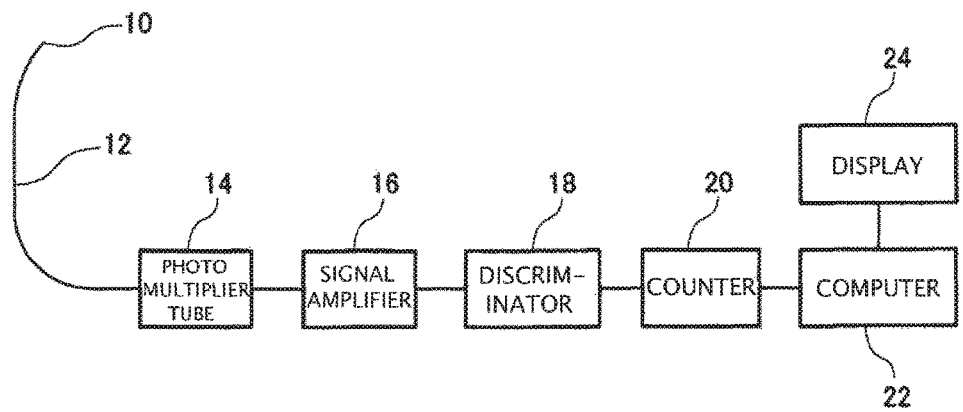
FIG. 1 A configuration diagram of a radiation dosimeter.

FIG. 1 is a configuration diagram of a radiation dosimeter according to the exemplary embodiment. The basic configuration is the same as that of the radiation dosimeter described in JP 4766407B. The radiation dosimeter includes a scintillator 10, an optical fiber 12, a photomultiplier tube 14, a signal amplifier 16, a discriminator 18, a counter 20, a computer 22, and a display 24, and measures an X-ray dose of the diagnostic X-rays.

The scintillator 10 is a scintillator containing a photopolymer resin or a mixture of a photopolymer resin and an inorganic fluorescent substance, as will be described in detail later, and converts ionizing radiation such as X-rays into light. The scintillator 10 is formed in a hemispherical shape of, for example, about 1 mmφ.

The optical fiber 12 is connected to the scintillator 10 and transmits the light converted from the ionizing radiation in the scintillator 10. The optical fiber 12 may be provided with a connector in the middle thereof and configured to be detachable as appropriate.

The photomultiplier tube 14 is connected to the optical fiber 12 and converts light transmitted from the optical fiber 12 into an electric signal corresponding to its intensity.

The signal amplifier 16 amplifies and outputs the electric signal from the photomultiplier tube 14.

The discriminator 18 compares the input electric signal with a predetermined threshold value, and discriminates electric signals having a signal level equal to or higher than the threshold value as events, thereby removing noise.

The counter 20 counts and outputs the events discriminated by the discriminator 18.

The computer 22 converts the count value by the counter 20 into an X-ray absorbed dose and displays the absorbed dose on the display 24.

Next, the scintillator 10 used in the exemplary embodiment will be described in detail.

As a result of intensive studies on energy sensitivity dependence of various materials in the energy range of diagnostic X-rays in the range of 40 kV to 150 kV, the present inventors have found that a photopolymer resin, particularly a dental photopolymer resin, has appropriate characteristics.

A photopolymer resin such as a dental photopolymer resin contains a polymerizable monomer, a filler, and a photopolymerization initiator.

It is known that upon receiving ultraviolet rays or the like, the photopolymerization initiator is bonded to the terminal of the polymer while substantially maintaining the original molecular size or in a state of being split into two or more molecules, and the molecules bonded to the terminal emit fluorescence. Upon receiving ultraviolet rays or the like, the photopolymerization initiator is brought into a radical state and is bonded to monomers or oligomers of main agents by attracting the monomers or oligomers in close proximity thereto. Then, the monomers or oligomers bonded to the initiator of the radical change into a radical state. Such reaction proceeds in succession, and the monomers or oligomers, which are small molecules, are eventually bonded to each other and changed into a high molecular polymer having a large molecular weight. The substance which was once used as a photopolymerization initiator is bonded to the head of the polymer after curing, and its property of very easily absorbing light energy remains even after curing. However, when the reaction is completed and the substance becomes stable, the absorbed light energy is converted into energy of fluorescence and emitted. Although not related to a radiation dosimeter, JP 2007-248244A or U.S. Pat. No. 7,785,524B discloses a method for estimating a state of an ultraviolet curing resin containing a main agent including at least one of a monomer and an oligomer, and a photopolymerization initiator, in which the photopolymerization initiator receives ultraviolet rays and emits fluorescence. Moreover, Yuki Nagaoka describes a method of evaluating a degree of UV curing by utilizing a property of the photopolymerization initiator that absorbs UV light and emits fluorescence in "Technology handbook of UV curing resin evaluation by fluorescence sensor," Osaka Science & Technology Center, Feb. 18, 2010.

As described above, it is known that the photopolymerization initiator absorbs UV light and emits fluorescence, and in the exemplary embodiment, the property of such a photopolymerization initiator that absorbs light energy and releases fluorescence is used for the scintillator 10, the fluorescence is detected by the photomultiplier tube 14, the signal amplifier 16, and the discriminator 18, and the fluorescence is counted as an event by the counter 20, thereby measuring the dose of X-rays. In the case where the photopolymerization initiator absorbs X-rays and emits fluorescence, the number of times of emission of the fluorescence and the dose value of X-ray are substantially in proportion to each other, but the relationship between the number of times of emission of fluorescence and the dose value of X-rays may be obtained in advance by experiment or the like and converted into X-ray dose by the computer 22.

Next, each component of the photopolymer resin used as the scintillator 10 will be described.

<Polymerizable Monomer>

As the polymerizable monomer, any polymerizable monomer having at least one polymerizable unsaturated group in the molecule may be used. Examples of the polymerizable unsaturated group present in the monomer molecule include an acryloxy group, a methacryloxy group, an acrylamide group, a methacrylamide group, a vinyl group, an allyl group, an ethynyl group, a styryl group, and the like. Specific examples of the compound include mono (meth)acrylate-based monomer such as methyl (meth)acrylate, ethyl (meth)acrylate, glycidyl (meth)acrylate, 2-cyanomethyl (meth)acrylate, benzyl (meth)acrylate, polyethylene glycol mono(meth)acrylate, allyl (meth)acrylate, 2-hydroxyethyl (meth)acrylate, glycidyl (meth)acrylate, 3-hydroxypropyl (meth)acrylate, and glyceryl mono (meth)acrylate; and polyfunctional (meth)acrylate-based monomer such as ethylene glycol di(meth)acrylate, diethylene glycol di(meth)acrylate, triethylene glycol di(meth)acrylate, nonaethylene glycol di(meth)acrylate, propylene glycol di(meth)acrylate, dipropylene glycol di(meth)acrylate, 2,2'-bis [4-(meth)acryloyloxyethoxyphenyl]propane, 2,2'-bis[4-(meth)acryloyloxyethoxyethoxypheny]propane, 2,2'-bis{4-[3-(meth)acryloyloxy-2-hydroxypropoxy] phenyl}propane, 1,4-butanediol (meth)acrylate, 1,6-hexanediol di(meth)acrylate, trimethylolpropane tri(meth)acrylate, urethane (meth)acrylate, and epoxy (meth)acrylate.

It is also possible to mix and polymerize polymerizable monomers other than the (meth)acrylate-based monomer. Examples of these other polymerizable monomers include fumaric acid ester compounds such as monomethyl fumarate, diethyl fumarate, and diphenyl fumarate; styrene such as styrene, divinylbenzene, α-methylstyrene, and α-methylstyrene dimer, α-methylstyrene derivatives; and allyl compounds such as diallyl phthalate, diallyl terephthalate, diallyl carbonate, and allyl diglycol carbonate. These polymerizable monomers may be used alone or in admixture of two or more, and oligomers containing them may also be used.

In the following, as the methacrylate-based monomer, in particular polyfunctional methacrylate capable of forming a post-cure crosslinked structure, there are exemplified chemical formulas of 2.2-bis[4-(2-hydroxy-3-methacryloxypropoxy)phenyl]propane (Bis-GMA), Bis-EMA(2.6), Bis-EMA(6), di(methacryloxyethyl)trimethylhexamethylene diurethane (UDMA), and triethylene glycol dimethacrylate (TEGDMA), respectively.

[Chem. 1]

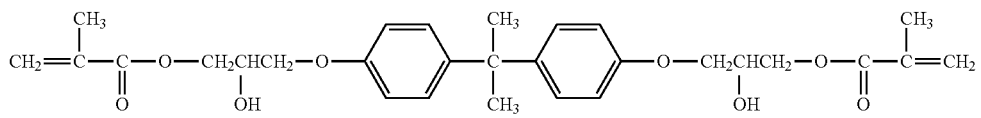

-continued

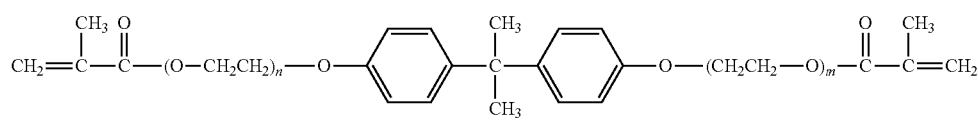

m + n = 2.6: Bis-EMA(2.6)
m, n = 6: Bis-EMA(6)

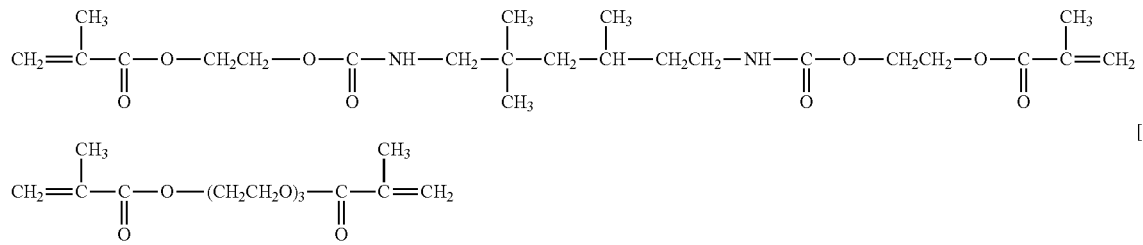

<Filler>

The mechanical properties of the photopolymer resin are determined by the type and amount of the filler added to the polymerizable monomer. As a filler blended in the polymerizable monomer, an organic filler, an inorganic filler, or a combination of an organic filler and an inorganic filler is used. For a dental composite resin, there are used a hybrid type filler in which a macro filler, a micro filler, and an organic composite filler are blended or a semi-hybrid type filler whose particle size distribution is adjusted so as to increase the packing ratio by finely grinding a macrofiller to about 0.1 to several µm, and these may be used.

Examples of the inorganic filler include silica; minerals using, as a base material, silica such as kaolin, clay, talc, and mica; and ceramics and glasses using silica as a base material and containing $Al_2O_3$, $B_2O_3$, $TiO_2$, $ZrO_2$, BaO, $La_2O_3$, $SrO_2$, CaO, $P_2O_5$, or the like. Preferred glasses are lanthanum glass, barium glass, strontium glass, soda glass, lithium borosilicate glass, zinc glass, fluoroaluminosilicate glass, borosilicate glass, and bio glass. In addition to these, crystal quartz, hydroxyapatite, alumina, titanium oxide, yttrium oxide, zirconia, calcium phosphate, barium sulfate, aluminum hydroxide, sodium fluoride, potassium fluoride, sodium monofluorophosphate, lithium fluoride, and ytterbium fluoride may also be used.

Examples of the organic filler include polymethyl methacrylate, polyethyl methacrylate, a polymer of polyfunctional methacrylate, polyamide, polystyrene, polyvinyl chloride, chloroprene rubber, nitrile rubber, and styrene-butadiene rubber.

Upon being hydrophobicized with a surface treatment agent typified by a silane coupling agent, the inorganic filler may become excellent in compatibility with the polymerizable monomer and may be improved in mechanical strength and water resistance. The hydrophobilization may be performed by a known method. Examples of the silane coupling agent include methyltrimethoxysilane, methyltriethoxysilane, methyltrichlorosilane, dimethyldichlorosilane, trimethylchlorosilane, vinyltrimethoxysilane, vinyltriethoxysilane, vinyltrichlorosilane, vinyltriacetoxysilane, vinyltris(β-methoxyethoxy)silane, γ-methacryloyloxypropyltrimethoxysilane, γ-methacryloyloxypropyltris(β-methoxyethoxy)silane, γ-chloropropyltrimethoxysilane, γ-chloropropylmethyldimethoxysilane, γ-glycidoxypropyltrimethoxysilane, γ-glycidoxypropylmethyldiethoxysilane, β-(3,4-epoxycyclohexyl)ethyltrimethoxysilane, N-phenyl-γ-aminopropyltrimethoxysilane, hexamethyldisilazane, γ-mercaptopropyltrimethoxysilane, γ-aminopropyltriethoxysilane, and the like.

Examples of the composite filler of an inorganic filler and an organic filler include a composite filler in which an inorganic filler is dispersed in an organic filler and a composite filler in which an inorganic filler is coated with an organic filler including a polymer of various polymerizable monomers.

<Photopolymerization Initiator>

As described above, in the exemplary embodiment, the dose of X-rays is measured using the property that the photopolymerization initiator absorbs X-rays and emits fluorescence, and its absorption wavelength must be at least in the wavelength region of the diagnostic X-rays. Specific examples of the photopolymerization initiator include a combination of α-diketone such as camphorquinone, and amines. In the polymerization initiation mechanism, radical species are generated by α-diketone excited by light irradiation withdrawing hydrogen from amines. Photo-excited α-diketone also functions as an electron acceptor, but its ability is low, and in the presence of a hydrogen donor such as amine, hydrogen withdrawal occurs preferentially over electron withdrawal. Examples of compounds capable of generating radical species by a hydrogen withdrawal reaction include α-diketones such as camphorquinone, benzyl, α-naphthyl, acetonaphthene, naphthoquinone, 1,4-phenanthrenequinone, 3,4-phenanthrenequinone, and 9,10-phenanthrenequinone; thioxanthones such as 2,4-diethylthioxanthone; and α-aminoacetophenone such as 2-benzyl-dimethylamino-1-(4-morpholinophenyl)-butanone-1, 2-benzyl-diethylamino-1-(4-morpholinophenyl)-butanone-1, 2-benzyl-dimethylamino-1-(4-morpholinophenyl)-propanone-1, 2-benzyl-diethylamino-1-(4-morpholinophenyl)-propanone-1, 2-benzyl-dimethylamino-1-(4-morpholinophenyl)-pentanone-1, and 2-benzyl-diethylamino-1-(4-morpholinophenyl)-pentanone. Among them, α-diketones such as camphorquinone, benzyl, α-naphthyl, acetonaphthene, naphthoquinone, 1,4-phenanthrenequinone, 3,4-phenanthrenequinone, and 9,10-phenanthrenequinone, are more preferred, and camphorquinone is preferred from the viewpoint of activity.

Further, examples of polymerization accelerator acting as a hydrogen donor when combined with a hydrogen withdrawal type polymerization initiator include tertiary amines such as N,N-dimethylaniline, N,N-diethylaniline, N,N-di-n-butylaniline, N,N-dibenzylaniline, N,N-dimethyl-p-toluidine, N,N-diethyl-p-toluidine, N,N-dimethyl-m-toluidine, p-bromo-N,N-dimethylaniline, m-chloro-N,N-dimethylaniline, p-dimethylaminobenzaldehyde, p-dimethylaminoacetophenone, p-dimethylaminobenzoic acid, ethyl p-dimethylaminobenzoate ester, amyl p-dimethylaminobenzoate ester, N,N-dimethylanthranic acid methyl ester, N,N-dihydroxyethylaniline, N,N-dihydroxyethyl-p-toluidine, p-dimethylaminophenetyl alcohol, p-dimethylaminostilbene, N,N-dimethyl-3,5-xylidine, 4-dimethylaminopyridine, N,N-dimethyl-α-naphthylamine, N,N-dimethyl-β-naphthylamine, tributylamine, tripropylamine, triethylamine, N-methyldiethanolamine, N-ethyldiethanolamine, N,N-dimethylhexylamine, N,N-dimethyldodecylamine, N,N-dimethylstearylamine, N,N-dimethylaminoethyl acrylate, N,N-dimethylaminoethyl methacrylate, and 2,2'-(n-butylimino)diethanol; barbituric acids such as 5-butylbarbituric acid, and 1-benzyl-5-phenylbarbituric acid; and mercapto compounds such as dodecyl mercaptane, and pentaerythritoltetrakis(thioglycolate). Among them, tertiary amines are preferred.

Further, as the photopolymerization initiator, a photopolymerization initiator that generates radical species by intramolecular cleavage may be used. Examples of the photopolymerization initiator include acylphosphine oxide derivatives such as 2,4,6-trimethylbenzoyldiphenylphosphine oxide, bis(2,6-dimethoxybenzoyl)-2,4,4-trimethylpentylphosphine oxide, and bis(2,4,6-trimethylbenzoyl)phenylphosphine oxide. These polymerization initiators are cleaved themselves by photoexcitation to generate radicals, and these radicals react with the polymerizable monomers to initiate polymerization.

A fluorescent colorant such as a coumarin colorant may be contained in the dental resin for aesthetic reasons or the like in some cases, and the fluorescent colorant may be contained in the photopolymer resin of the exemplary embodiment.

EXAMPLES

Example 1

A commercially available dental filling composite resin was used as a photopolymer resin. The composite resin contains Bis-MPEPP/Bis-GMA/TEGDMA as a polymerizable monomer, silica zirconia filler/silica titania filler as a filler, and camphorquinone as a photoinitiation polymerization agent. The particle diameter distribution of the filler is 0.2 to 80 μm, the filling rate of the filler is 82% by weight, and the filling rate of the inorganic filler is 69% by weight. Using the composite resin for the scintillator 10, the X-ray tube voltage was varied in a range of 40 kV to 150 kV, and its energy sensitivity was measured. Based on energy sensitivity of tube voltage=80 kV, the relative sensitivity to this was measured.

Example 2

Energy sensitivity was measured in the same manner as in Example 1, using as a scintillator 10 the same photopolymer resin as in Example 1, except for further containing 0.08% by weight of $Zn_2SiO_4$ as an inorganic fluorescent material.

Comparative Example 1

Using a conventional plastic scintillator 10, the energy sensitivity was measured in the same manner as in Example 1. As the plastic scintillator 10, a plastic scintillator BC490 (Saint-Gobain CDJ) was used.

Figure 2:
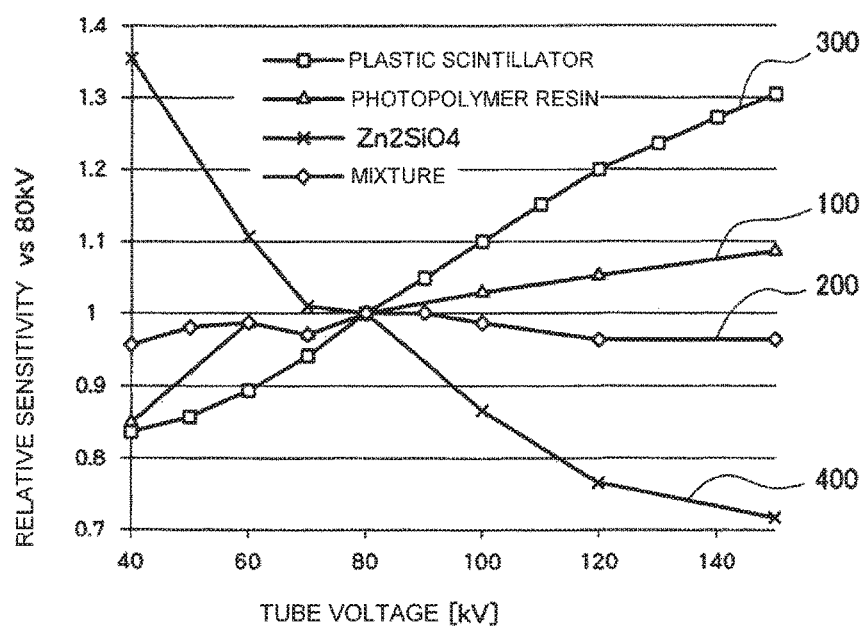
FIG. 2 A graph illustrating a relationship between a tube voltage and a relative sensitivity in Examples.

FIG. 2 illustrates the results. In FIG. 2, a graph 100 of "photopolymer resin" indicates the relative sensitivity of Example 1, a graph 200 of "mixture" indicates the relative sensitivity of Example 2, and a graph 300 of "plastic scintillator" indicates the relative sensitivity of Comparative Example 1. For reference, the relative sensitivity of the fluorescent substance $Zn_2SiO_4$ added in Example 2 is indicated by a graph 400.

As can be seen from these graphs, the relative sensitivity of the photopolymer resin scintillator of Example 1 was greatly improved as compared with the conventional plastic scintillator. Furthermore, in the scintillator of Example 2 in which a small amount of $Zn_2SiO_4$ was added to the photopolymer resin of Example 1, the relative sensitivity was further improved, and the change in relative sensitivity was improved to 3% or less in the range of 40 kV to 150 kV.

The relative sensitivity in Example 2 is further improved as compared with that of Example 1 because the relative sensitivity of the added fluorescent substance $Zn_2SiO_4$ is high in the low energy region and low in the high energy region as illustrated in the graph 400 of FIG. 2, whereas the relative sensitivity of the photopolymer resin of Example 1 is low in the low energy region and high in the high energy region. In other words, since the relative sensitivity characteristic of the $Zn_2SiO_4$ is complementary to the relative sensitivity characteristic of the photopolymer resin in the X-ray energy range of 40 kV to 150 kV, it can be understood that the satisfactory relative sensitivity change was consequently obtained by compensating the relative sensitivity of the photopolymer resin with the relative sensitivity of the $Zn_2SiO_4$; that is, by increasing the sensitivity of the photopolymer resin in the low energy region and lowering the sensitivity in the high energy region.

The present inventors have confirmed that the relative sensitivity of the photopolymer resin may be improved even in the case where the addition amount of $Zn_2SiO_4$ is 0.01%, 0.05%, or 1%, but the relative sensitivity may be further improved in the case where the addition amount is 0.08% (Example 2). Of course, when the addition amount of $Zn_2SiO_4$ is small, the effect of improving the relative sensitivity may not be sufficiently obtained. Conversely, when the addition amount of $Zn_2SiO_4$ is too large, the relative sensitivity of $Zn_2SiO_4$ dominates, so that the relative sensitivity of the photopolymer resin may be deteriorated. Therefore, the addition amount of $Zn_2SiO_4$ is preferably 0.01% by weight to 1% by weight based on the photopolymer resin.

As described above, the relative sensitivity dependence may be remarkably improved in the range of 40 kV to 150 kV, which is the energy range of diagnostic X-rays, by using a photopolymer resin such as a dental resin for the scintillator 10. Further, the relative sensitivity characteristic may be further improved by including a fluorescent substance whose relative sensitivity characteristic is complementary to the relative sensitivity characteristic of the photopolymer resin.

When the dental resin is used for the scintillator 10, there is also a feature that the biocompatibility is excellent when it is touched directly by a patient who is subjected to diagnosis, or when exposure dose measurement is performed in the body.

Although the exemplary embodiment of the present disclosure has been described above, the present disclosure is not limited thereto, and various modifications are possible.

For example, in the exemplary embodiment, $Zn_2SiO_4$ is exemplified as an example of the inorganic fluorescent substance added to the photopolymer resin, but it is also possible to use other inorganic substances whose relative sensitivity characteristic is complementary to the relative sensitivity characteristic of the photopolymer resin (e.g., $BaAl_{12}O_{19}$, $BaMgAl_{14}O_{23}$, etc.). In addition, the inorganic fluorescent substance to be added is not necessarily limited to one type, and two or more kinds thereof may be used.

REFERENCE SIGNS LIST 10 scintillator, 12 optical fiber, 14 photomultiplier tube, 16 signal amplifier, 18 discriminator, 20 counter, 22 computer, 24 display

The invention claimed is:

1. A scintillator for a radiation dosimeter, the scintillator comprising:
    a photopolymer resin that contains a polymerizable monomer, a filler, and a photopolymerization initiator.
2. The scintillator for a radiation dosimeter according to claim 1, wherein the photopolymer resin further contains an inorganic fluorescent substance.
3. The scintillator for a radiation dosimeter according to claim 2, wherein the inorganic fluorescent substance has a relative sensitivity characteristic in an X-ray energy range of 40 kV to 150 kV which has a complementary relationship with a relative sensitivity characteristic of the photopolymer resin.
4. The scintillator for a radiation dosimeter according to claim 2, wherein the inorganic fluorescent substance is $Zn_2SiO_4$.
5. The scintillator for a radiation dosimeter according to claim 4, wherein a content of the inorganic fluorescent substance is 0.01% by weight to 1% by weight.
6. The scintillator for a radiation dosimeter according to claim 1, wherein the polymerizable monomer contains polyfunctional methacrylate.
7. The scintillator for a radiation dosimeter according to claim 1, wherein the photopolymerization initiator contains camphorquinone and amines.
8. The scintillator for a radiation dosimeter according to claim 1, wherein the polymerizable monomer contains polyfunctional methacrylate, the photopolymerization initiator contains camphorquinone and amines, and the photopolymer resin contains an inorganic fluorescent substance, and the inorganic fluorescent substance has a relative sensitivity characteristic in an X-ray energy range of 40 kV to 150 kV which has a complementary relationship with a relative sensitivity characteristic of the photopolymer resin.
9. The scintillator for a radiation dosimeter according to claim 8, wherein the inorganic fluorescent substance contains at least one of $Zn_2SiO_4$, $BaAl_{12}O_{19}$, or $BaMgAl_{14}O_{23}$.
10. A radiation dosimeter comprising:
    the scintillator according to claim 1;
    a photoelectric converter that converts light from the scintillator into an electric signal;
    a counter that counts the number of events whose intensity is equal to or greater than a predetermined threshold with respect to the output from the photoelectric converter; and
    a calculating unit that converts a count value of the counter into a radiation dose and outputs the radiation dose.

* * * * *